United States Patent Office 3,334,836
Patented Aug. 8, 1967

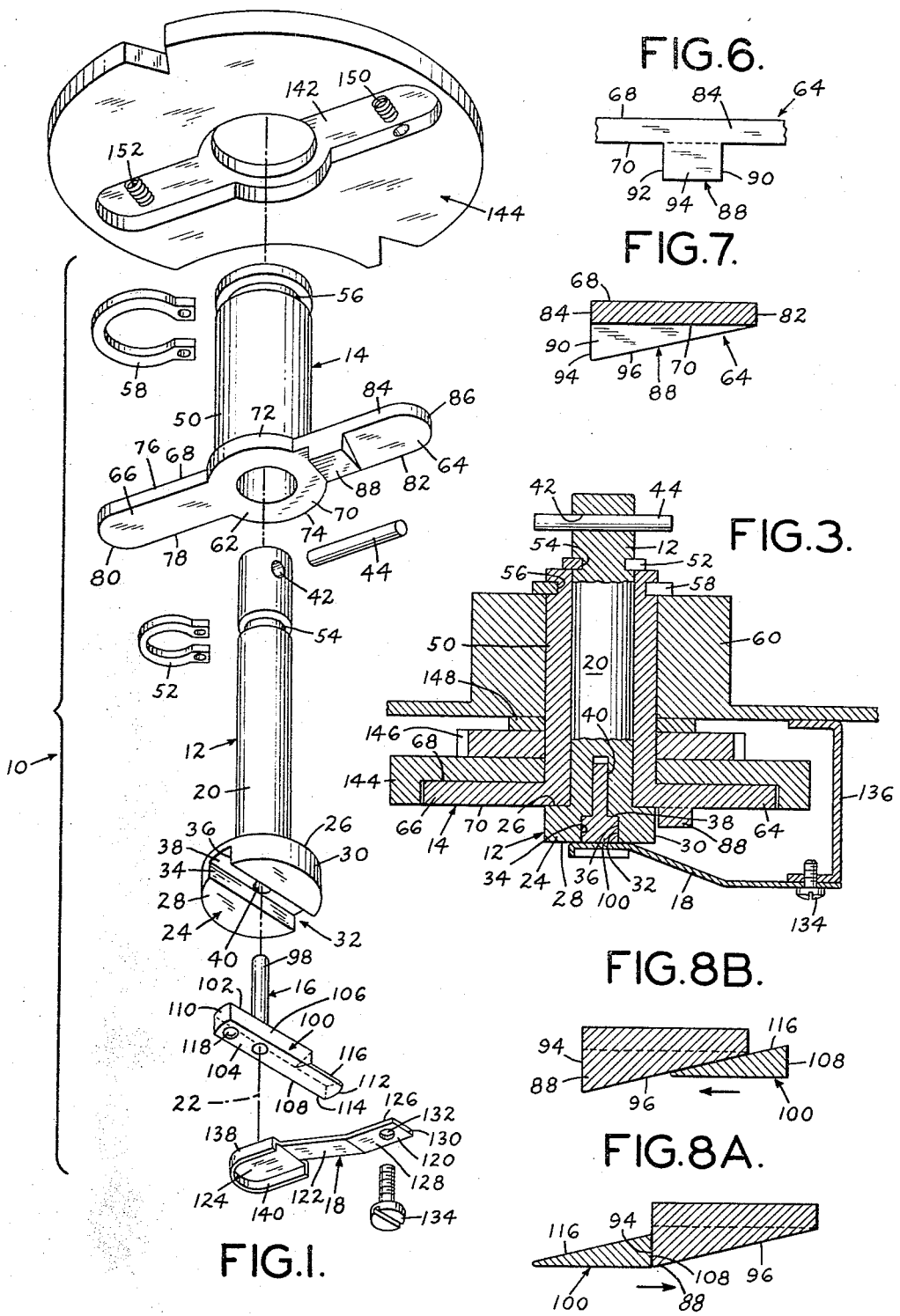

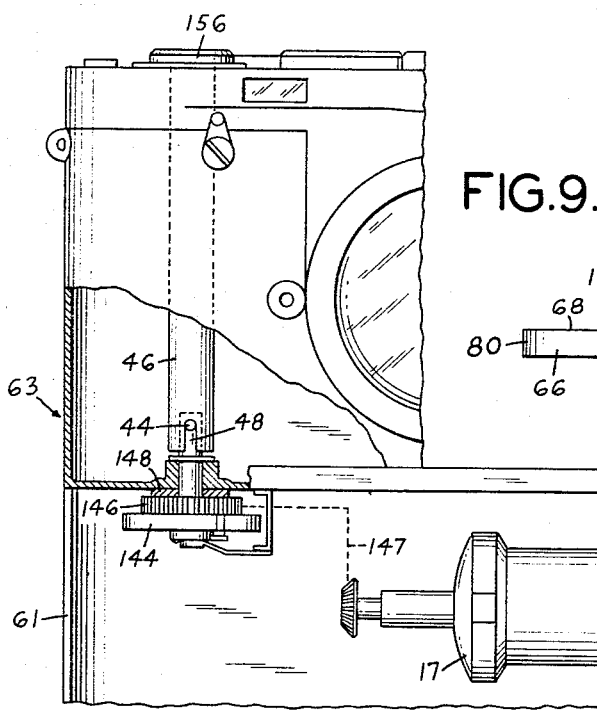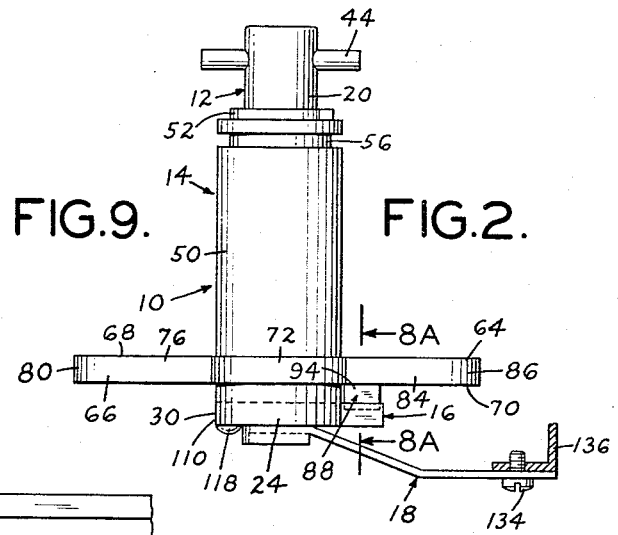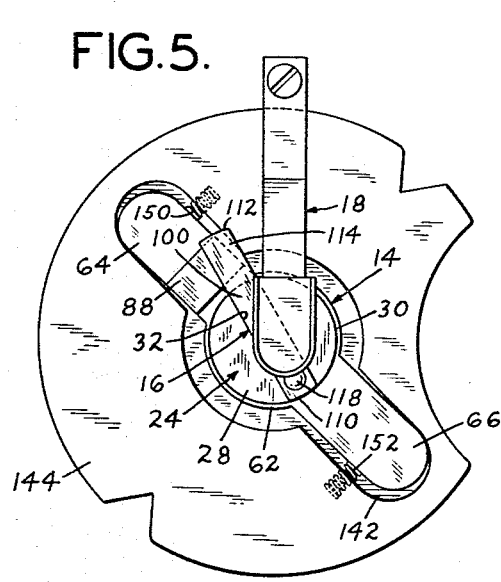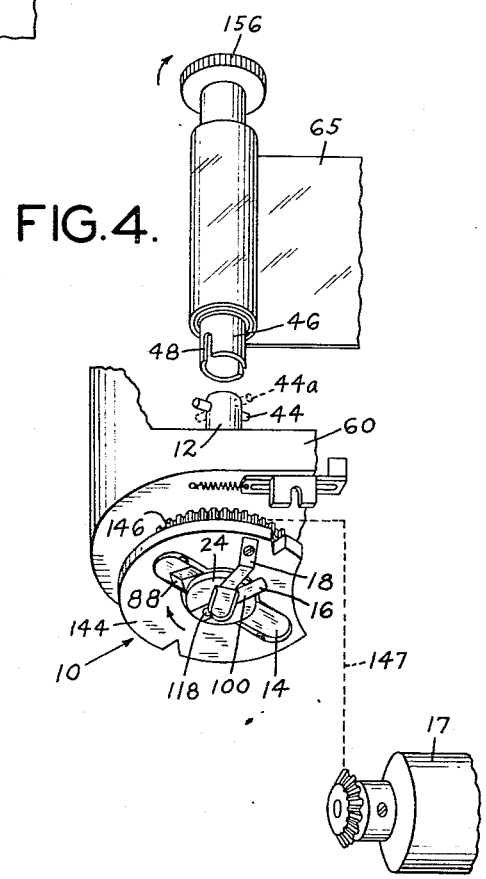

3,334,836
TRANSMISSION MECHANISM FOR A ROLL
FILM CAMERA
Norman N. Goldberg, Madison, Wis., assignor to E. Leitz,
Inc., New York, N.Y., a corporation of New York
Filed Apr. 21, 1966, Ser. No. 544,195
4 Claims. (Cl. 242—71.3)

ABSTRACT OF THE DISCLOSURE

A drive mechanism for a roll film camera equipped with a motor driven rapid sequence control mechanism in which the drive mechanism may be motor operated or manually operated. The drive mechanism employs a drive member with an elongated shaft and means for engaging the drive member with the film spool drive shaft. A second drive member is operatively coupled to the motor and is rotatable about the shaft of the first drive member. A drive key is coupled to the first drive member and is arranged to be contacted by a ramp member of the second drive member to rotate the first drive member and advance the film when the motor is operated. When the film spool drive shaft is manually operated, the ramp member disengages the first and second drive members. The first drive member is automatically operatively aligned with the film spool drive shaft.

---

This invention relates to camera mechanisms and more particularly to a drive mechanism which permits manual operation of a film winding mechanism, such as a film spool drive shaft, of a roll film camera equipped with a rapid sequence control mechanism similar to that described in my co-pending patent application S.N. 416,018, filed Dec. 4, 1964 and entitled Control Mechanism for a Roll Film Camera, now Patent No. 3,280,713, granted Oct. 25, 1966. The control mechanism as described in that application is provided for use in connection with a roll film camera for rotating the film winding mechanism for automatically making a series of film exposures in rapid sequence. However, in roll film cameras equipped with the control mechanism described in that application, the film winding mechanism cannot be manually rotated for taking individual pictures.

A primary object of the present invention is to provide mechanism which permits normal manual operation of a roll film camera equipped with a rapid sequence control mechanism like that described in the above identified application, that is, to provide mechanism which permits the manual rotation of the film spool drive shaft of such a roll film camera.

Another object of the present invention is to provide means for automatically aligning the drive member of the present mechanism for mating engagement with the collar of the film spool drive shaft of the camera to which the mechanism is to be attached.

Further objects and features of this invention will be apparent from the following detailed description taken in conjunction with the accompanying drawings in which:

FIGURE 1 is an exploded perspective view of apparatus embodying the present invention;

FIGURE 2 is an assembly view of the apparatus of this invention;

FIGURE 3 is a sectional view, partly in elevation, of the apparatus of the present invention;

FIGURE 4 is a perspective view, partly schematic, showing the relationship of the present invention to an electric drive motor and a spool film operating device of a typical camera;

FIGURE 5 is a bottom view of the assembly of FIGURE 2;

FIGURES 6, 7, 8A and 8B are detail views of the sliding ramp feature of the present invention, FIG. 8A being a cross sectional view taken along the line 8A—8A of FIG. 2 and FIG. 8B being a similar view having the cross member shown in another position; and FIGURE 9 is a front elevational view partly cut away and partly schematic, showing apparatus embodying the present invention connected to a typical camera.

Referring now to the drawings, FIGURE 1 shows the ratchet mechanism 10 of this invention in an exploded view. Broadly the invention is made up of a drive member 12, a rotatable sleeve 14 which fits over the drive member 12 and is arranged for rotation about it, and a T-shaped drive key 16 adapted to transmit a rotational force from the drive member to the rotatable sleeve when the drive member is driven by a motor 17 (FIGURES 4 and 9), such as is desired in the above mentioned co-pending application. The T-shaped drive key is adapted to be easily disengaged from the rotatable sleeve when the rotatable sleeve 14 is manually rotated. A leaf spring 18 yieldably urges the T-shaped drive member into contact with the rotatable sleeve.

As may be seen in FIGURES 1, 2 and 3, the drive member 12 is made up of a stem or elongated shaft portion 20 which comprises a cylindrical shaft concentric about an axis of rotation 22. Near one end, which is the lower end when the ratchet mechanism is in place in a camera and the camera is in the normal operating position, an enlarged head 24 is formed integral with the stem portion. The head is defined by an upper surface 26, and a lower surface 28. The head 24 is substantially cylindrical and its sides are defined by surface 30. A groove 32 is formed in the lower portion of the head 24 and is substantially symmetrical about the axis of rotation 22. The slot is defined by side walls 34 and 36, and upper surface 38. A counterbore 40 is defined in the stem portion 20, is concentric about the axis of rotation 22, and extends upwardly from the upper surface 38 of the slot 32.

Near the upper end of the stem portion 20 is a transverse pinway 42 which is adapted to receive a pin 44. As may best be seen in FIGURE 4, the transverse pin 44 rotates the camera's film winding mechanism by engaging a slot 48 defined in the lower end portion of the film spool drive shaft 46 when the ratchet mechanism is assembled with the camera.

As may be seen in FIGURES 1, 2 and 3, the rotatable sleeve 14 is further comprised of a hollow cylindrical portion 50 which has an inside diameter such as to permit it to fit over the stem portion 20 and be freely rotatable without excessive transverse motion. The rotatable sleeve 14 is maintained in position on the drive member 12 by means of a U-shaped fastener 52 which engages a groove 54 in the stem portion 20 of the drive member located intermediate the enlarged head 24 and the pinway 42.

Similarly, the cylindrical portion 50 of the rotatable sleeve 14 has defined within it adjacent its upper end, a groove 56 which is adapted to receive a U-shaped fastener 58 which retains the rotatable sleeve in the supporting member 60 (FIGURE 3) which is adapted to be fastened to the bottom of the camera. The supporting member 60 may be a housing plate of a rapid sequence control mechanism 61.

At its opposite or lower end the rotatable sleeve 14 has an integral head portion 62 having oppositely disposed wing members 64 and 66. The head portion is defined by upper planar surface 68, lower planar surface 70 and walls 72 and 74 which are arcuate and concentric about the axis 22. The wing member 66 is defined by substantially parallel walls 76, 78 extending from the axis of rotation 22 at substantially right angles, and joined at their distal ends by arcuate portion 80 which may be semicircular, as shown. Similarly, wing member 64 is defined by substantially parallel walls 82 and 84 which extend at substantially right angles from the axis of rotation and are joined at their distal portions by arcuate portion 86 which may be semicircular, as shown. On the lower surface 70 of the wing member 64 there is defined an inclined drive ramp 88 which as may be seen in FIGURES 6 and 7 is defined by wide walls 90 and 92 at substantially right angles to surface 70, a rear wall 94 which may be substantially coplanar with wall 84 of wing member 64, and inclined planar surface 96 extending from wall 82 to wall 94.

As may be seen in FIGURE 1, the T-shaped drive key 16 comprises a cross-member or bar portion 100 connected to the end of a cylindrical stem portion 98. The stem portion is so sized as to fit within the counterbore 40 with little transverse motion. The cross-member 100 is defined by an upper surface 102 and a lower surface 104. Side walls 106 and 108 define the thickness or width of the cross-member 100. The length or transverse extent is defined by arcuate walls 110 and 112. As may be best seen in FIGURE 5 the length of the cross-member 100 is substantially coextensive with the outer surface 30 of the enlarged head 24 of the drive member 12 when the stem portion 98 is in place in the counterbore 40 and the cross-member is therefore in place in the slot 32 in head 24 of drive member 12. In its other extremity the cross-member 100 is so proportioned that the arcuate wall 112 extends beyond the side wall 90 of the inclined drive ramp 88 and defines portion 114. In the longer extending portion 114 an inclined wall 116 is defined in side wall 108 (FIGURES 1, 8A and 8B).

A detent 118 is mounted on the lower surface 104 adjacent the arcuate wall 110 and is adapted to be engaged by the leaf spring 18. The drive key 16 is retained within the slot 32 and counterbore 40 by an elastic force applied by the leaf spring 18. The leaf spring 18 is comprised of a first portion 120, a second portion 122 and a third portion 124. The spring is substantially flat having an upper side 126 and a lower side 128, and side wall 130. The first portion contains an orifice 132 which is adapted to receive a fastener 134, such as a machine screw. As may be seen in FIGURE 3 the fastener 134 fixedly connects the spring 18 to a supporting member 136, which is connected to the supporting member 60. The second portion 122 is permanently inclined upwardly at an angle from the plane of the first portion 120 to adjust the location of the third portion 124 against the surface 104 of the cross-member 100 and to one side of the axis of rotation 22 in order to engage the detent 118. The third portion 124 has a folded-over edge portion defined by walls 138 and 140.

The leaf spring 18 engages the cross-member 100 for maintaining the cross-member in the slot 32 at all times, but allowing the cross-member 100 to be moved downwardly in the groove to permit cross-member 100 to slide across the drive ramp 88, during manual operation. The detent 118 on drive key 16 is adapted to be engaged by the leaf spring 18 as will be further described below.

Referring now to FIGURES 2, 3, 4 and 5, the ratchet mechanism 10 of the present invention is adapted for use in connection with the rapid sequence control mechanism described in the above identified application. Portions of that control mechanism are shown in FIGURES 4 and 9. The rotatable sleeve 14 is rotatably mounted in the supporting member 60 which may be a housing plate of the rapid sequence control mechanism 61. The latter mechanism 61 may be fastened onto the bottom of a roll film camera 63 in the same manner as a standard camera base plate. The head portion 62 of the rotatable sleeve 14 is positioned within a recess 142 in a drive cam 144 of the rapid sequence control mechanism 61. The drive cam 144 is fixedly secured to a gear 146 which is spaced apart from the supporting member by a washer 148. The gear 146 is driven by the motor 17 through a gear train, indicated at 147, of the rapid sequence control mechanism 61. As may be best seen in FIGURE 5, recessed springs 150 and 152 resiliently urge the wing members 64 and 66 against the side of the recess 142. The rapid sequence control mechanism 61 operates to intermittently advance the film 65 in the roll film camera 63 for taking a preselected number of film exposures in rapid succession, as described in the above identified application.

In operation, the drive member 12 is rotatably received in the sleeve 14 and carries the transverse pin 44 for engagement in the slot 48 in the film spool drive shaft 46 in order to advance the film in the camera. The enlarged head 24 at the opposite end of the drive member 12 slidably engages the head portion 62 of sleeve 14. The vertical stem portion 98 of drive key 16 is longitudinally slidably received in the counterbore 40 in the drive member 12 and the cross-member 100 is received in the groove 32 in the enlarged head 24. When the rapid sequence control mechanism 61 is in use, the motor 17, through gear train 147, drives the gear 146 and the cam 144 causing the sleeve 14 to rotate. As is indicated in FIGURE 8A, rear wall 94 of the drive ramp 88 on the wing member 64 of the sleeve 14 engages the side wall 108 of the cross-member 100 of the drive key 16 which in turn rotates the drive member 12. Pin 44 of the drive member 12 is engaged in slot 48 of the film spool drive shaft 46 and advances the film 65 in the camera.

The mechanism of the present invention permits normal manual operation of the camera in the following manner. The operator rotates the knob 156 connected to the film spool drive shaft 46 for advancing the film into position for making the next film exposure. The present drive mechanism 10 permits manual rotation of the film spool drive shaft 46 even though the pin 44 is engaged in the slot 48. The drive key 16 is longitudinally slidable in the drive member 12 so that the inclined surface 116 of the cross-member 100 slides across the inclined planar surface 96 of the drive ramp 88 as the film spool drive shaft is manually rotated (FIGURE 8B). This occurs because there is a relative motion of the cross-member 100 with regard to the drive ramp 88 due to the rotatable sleeve 14 remaining stationary while the drive member 12 is manually rotated.

As best seen in FIGURE 3, the thickness of the enlarged head 24 of the drive member 12 is greater than the height of the rear wall 94 of the drive ramp 88. Therefore the cross-member 100 of the drive key 16 remains in the groove 32 as the cross-member 100 rides across the inclined planar surface 96 of the drive ramp 88. The cross-member 100 of the drive key 16 is returned to the top of the groove 32 by the resilient force applied by the leaf spring 18.

A second feature of the present invention may best be understood with reference to FIGURE 4. When the mechanism embodying the present invention is removed from the camera, the drive member 12 may become inadvertently manually turned so that the cross pin 44 is not in alignment with the slot 48 in the film spool drive shaft 46. As seen in FIGURE 4, when the cross pin 44 is misaligned as at 44a, the drive ramp 88 will be out of engagement with the cross-member 100 of the drive key 16. When such misalignment occurs, the mechanism cannot be remounted on the shaft until the misalignment is corrected. Therefore, the drive member 12 must be rotated so that the cross pin 44 aligns with the slot 48 of the film spool drive shaft 46 of the camera.

The present mechanism 10 provides means for automatically realigning the cross pin 44 for mating engagement in the slot 48. The rounded detent 118 provided on the cross-member 100 of the T-shaped drive key 16 aids in accomplishing this end. The detent 118 is adapted to be engaged by the third portion 124 (or dished edge) of tated until the drive ramp 88 catches up to and engages the cross-member 100 when the sleeve is rotated by the motor 17 of the rapid sequence control mechanism 61. If the braking action of the leaf spring 18 is not applied to the detent 118 the drive member 12 would be rotated by its frictional contact with the sleeve 14 even though the drive ramp 88 was not engaging the cross-member 100. Therefore without the leaf spring action, if the sleeve 14 were driven around a complete cycle, the cross pin 44 would still be out of alignment with the slot 48.

When the motor 17 of the rapid sequence control mechanism 61 is operated to rotate the sleeve 14, the drive key 16 and the drive member 12 will be rotated with the sleeve due to the frictional contact between the drive member 12 and the sleeve 14 until the detent 118 engages the leaf spring 18. The braking action of the leaf spring 18 on the detent 118 is sufficient to overcome the frictional forces between the drive member 12 and the sleeve 14 so as to hold the drive key 16 and drive member 12 against rotation until the drive ramp 88 catches up to and engages the cross-member 100. The force of the drive ramp 88 on the cross-member 100 will then cause the detent 118 to slide over the resilient leaf spring 18. The sleeve 14 will then complete its cycle and come to rest in such a position that the cross pin 44 of the drive member 12 will be in alignment for mating engagement with the slot 48 of the film spool drive shaft 46.

In use it has been found advantageous to depress the actuator of the rapid sequence control mechanism 61 for sufficient time to allow the motor to rotate the sleeve 14 through two revolutions, to make sure that the drive member 12 is properly aligned. The reason for this, is that the first revolution will assure that the detent 118 has been rotated around into engagement against the leaf spring 18 and therefore that the drive member 12 and the drive key 16 are being held against rotation so that the drive ramp 88 is brought into engagement with the cross-member 100 of the drive key 16. The second revolution will cause the drive ramp 88 to rotate the drive member 12 into the proper position so that the cross pin 44 will align with the slot 48 of the film spool drive shaft to facilitate the attachment of the mechanism to the camera.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In a film winding mechanism having a motor drive, the improvement providing for manual operation of the film winding mechanism comprising:
   (a) a first drive member having an elongated shaft portion, a first coupling means adjacent one end of said shaft portion and adapted for engagement with a film spool drive shaft, and a second coupling means formed at the other end of said shaft portion;
   (b) a second drive member having a substantially cylindrical portion adapted to rotate about said elongated shaft portion of said first drive member, means to connect said second drive member with the motor drive, and an inclined ramp member connected to said second drive member;
   (c) a drive key adapted to be coupled to said first drive member by said second coupling means and having a portion adapted to be engaged by said ramp member of said second drive member, whereby when said second drive member is rotated by said motor, said ramp member engages and rotates said drive key, and said drive key rotates said first drive member thereby winding the film.

2. In a film winding mechanism having a motor drive, the improvement providing for manual operation comprising:
   (a) a first drive member further comprising:
      (1) an elongated shaft portion adapted to rotate about an axis,
      (2) a first coupling means adjacent one end of said shaft portion and adapted to removably engage a film spool drive shaft, and
      (3) a ramp member having a first surface adapted end of said shaft portion;
   (b) a drive key adapted to be coupled to said first drive member by said second coupling means and having an inclined surface portion;
   (c) a second drive member further comprising:
      (1) a substantially cylindrical portion adapted to rotate about said shaft portion of said first drive member between said first and second coupling means,
      (2) drive means connected to one end of said cylindrical portion and adapted to be coupled to the motor drive,
      (3) a ramp member having a first surface adapted to fixedly engage said drive key when said second drive member is rotated in one direction and a second surface adapted to slidably engage said inclined surface portion of said drive key when said second drive member is rotated in the opposite direction; and
   (d) resilient means yieldably connected to said drive key and adapted to retain said drive key in said second coupling means while permitting said drive key to ride over said ramp.

3. The improvement in a film winding mechanism described in claim 2 and having further capability for aligning said first coupling means with said film spool drive shaft further comprising a detent connected to the surface of said drive key adjacent said resilient means, and adapted to engage said resilient means, whereby said drive key may be restrained from rotating except when impelled by said second drive member.

4. In a film winding mechanism having a motor drive, the improvement providing for manual operation of the film winding mechanism and for alignment of the drive member with the film spool drive shaft comprising:
   (a) a first drive member further comprising:
      (1) an elongated shaft portion adapted to rotate about an axis,
      (2) first coupling means adjacent one end of said shaft portion and adapted to removably engage the film spool drive shaft,
      (3) an enlarged head formed at the other end of said shaft portion, a groove formed in said head, a counterbore formed in said shaft portion adjacent said slot about said axis of rotation;
   (b) a drive key further comprising:
      (1) a shaft portion adapted to removably and rotatably engage said counterbore,
      (2) a bar portion at one end of the shaft portion, said bar portion being adapted to removably engage said groove in said head, a portion of said bar portion being adapted to extend beyond said enlarged head and having an inclined surface formed thereon,
      (3) a detent connected to said bar portion opposite said shaft portion and off-center of the axis of rotation;
   (c) a second drive member further comprising:
      (1) a substantially cylindrical portion adapted to rotate about said shaft portion of said first drive member between said first coupling means and said enlarged head, (2) drive means connected to one end of said cylindrical portion adjacent said enlarged head and adapted to be coupled to the motor drive,
(3) a ramp member having a first surface adapted to fixedly engage said drive key when said second drive member is rotated in one direction and a second surface adapted to slidably engage said inclined surface of said drive key when said sleeve is rotated in the opposite direction; and
(d) a leaf spring yieldably connected to said drive key and adapted to retain said drive key in said groove while permitting the drive key to slide across said ramp.

References Cited
UNITED STATES PATENTS 2,245,214  6/1941  Mihalyi _____ 242—71.3

FRANK J. COHEN, *Primary Examiner.*

N. L. MINTZ, *Examiner.*